Sept. 27, 1932.   D. C. GOCKEL   1,879,677
ARTIFICIAL FLOWER AND METHOD OF MAKING SAME
Filed Aug. 12, 1929
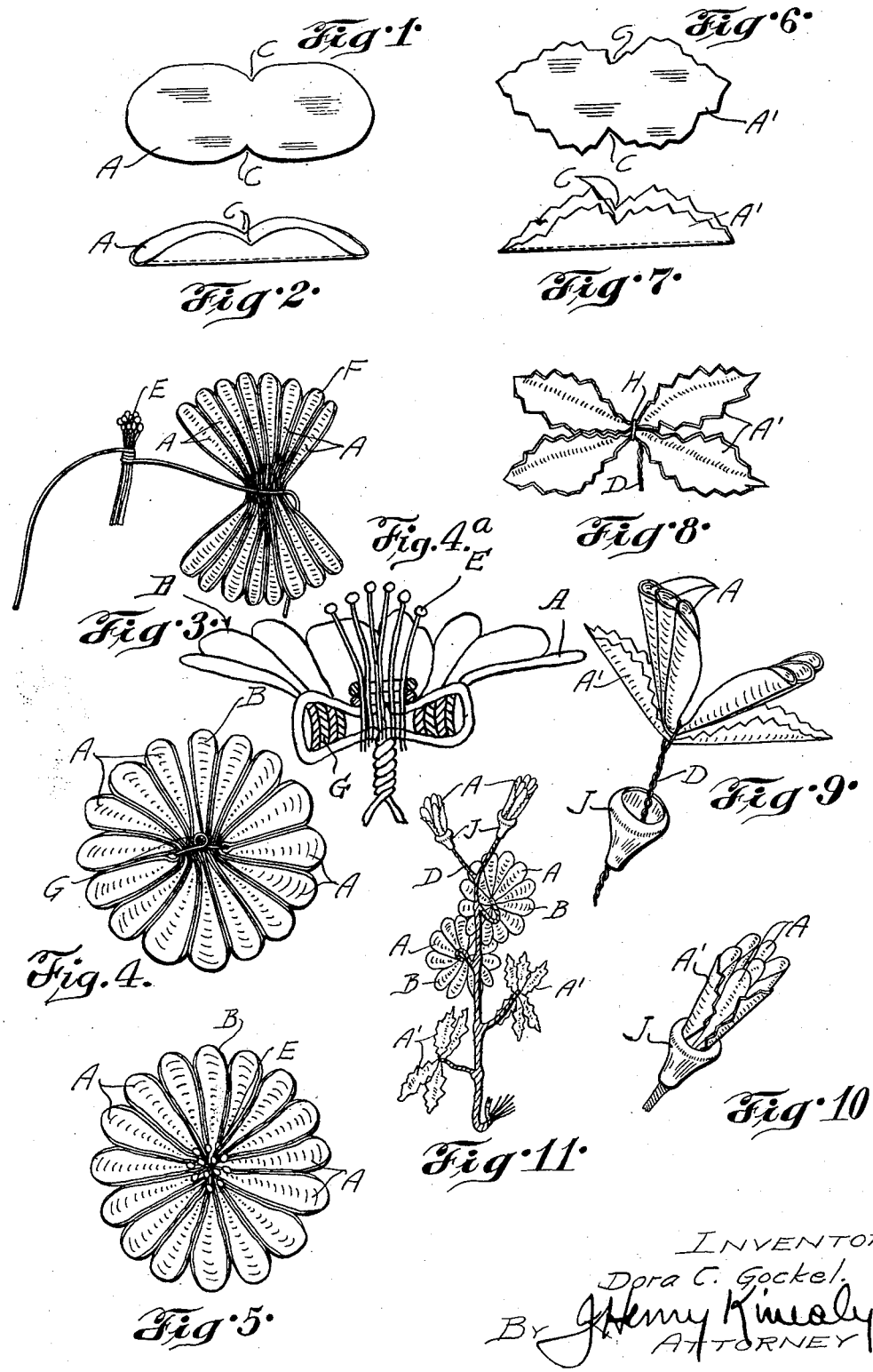

Patented Sept. 27, 1932

1,879,677

UNITED STATES PATENT OFFICE

DORA C. GOCKEL, OF ST. LOUIS, MISSOURI

ARTIFICIAL FLOWER AND METHOD OF MAKING SAME

Application filed August 12, 1929. Serial No. 385,185.

My invention relates to artificial flowers and method of making same and more particularly to artificial flowers such as are used for decoration on women's wearing apparel.

Heretofore in making artificial flowers difficulty has been encountered in forming flowers that looked natural and yet could be worn for a reasonable period of time without deteriorating in appearance. The unnatural appearance of the flowers heretofore made has been due largely to the manner in which they were formed and to the material from which they were made, but, of course, deterioration has been due only to the material from which the various parts of the flowers were formed. If a material having sufficient wearing qualities were used for the flowers they would have an unnatural appearance and if materials approaching in appearance the different parts of a real flower were used they would not have sufficient wearing qualities to make their use practical.

The object of my invention is to provide an artificial flower and method of making same which flower will be serviceable and will combine long wearing qualities with natural appearance.

At the outset it should be clearly understood that in making different artificial flowers in imitation of various real flowers, the shape of the various parts used and the method of combining them in an artificial flower must, necessarily, be varied somewhat. However, I have found that in practicing my invention all of the flowers which may be made artificially in the manner contemplated by my invention are formed in broadly the same way and, therefore, for illustration in the accompanying drawing and description in the specification below I have selected a simple flower, but I do not intend to limit myself to any one flower.

This simple embodiment of my invention is shown in the accompanying drawing wherein similar characters are used to designate similar parts: Fig. 1 shows the pattern for a petal leaf forming part of the flower; Fig. 2 shows the leaf folded, as described below; Fig. 3 shows a step in the formation of a flower; Fig. 4 is a view from the underside of a finished flower; Fig. 5 is a top view of the flower shown in Fig. 4; Figs. 6 and 7 show a foilage leaf; Fig. 8 shows these leaves attached to a stem; Figs. 9 and 10 show the method of forming a bud; and Fig. 11 shows a completed spray of flowers and buds.

Referring to the figures in the embodiment shown therein each of the petal leaves A of the flower B are formed, preferably, of a thin sheet of rubber or other elastic material in the shape shown in Fig. 1 wherein the leaf is elongated and has a notch C formed in each of its side edges substantially centrally longitudinally thereof.

The stem D of a flower is preferably formed of twisted wire so as to be substantially rigid, as particularly shown in Fig. 9 and the stem of a flower B has at its upper end a plurality of stamen E around which the wire forming the stem may be wrapped. The petal leaves of the flower B are divided into two groups F and a loop G, preferably of wire, extends from the stem D around the leaves in each group, whereby the leaves are attached to the stem, all as described below.

The foliage leaves A' used in forming a spray of flowers are, as shown in Figs. 6 and 7, substantially similar in shape to the petal leaves A, and in forming a sprig of leaves they are attached to a stem D by a single loop H, as shown in Fig. 8.

A bud, as shown in Fig. 9, preferably is formed of a few petal leaves A and one or more foliage leaves A' attached to a stem D by a single loop H' and then partially covered by a thimble J, as shown.

The method of assembling the parts described above is as follows: In forming a flower B the wire used to form a stem D, preferably, is wrapped several times around a plurality of stamens E. Each of the petal leaves A are then folded longitudinally, as shown in Fig. 2, so as to bring the notches C in opposite edges thereof in register and a group of leaves so folded are positioned on one side of the stem with the side portions of the leaves extending upwardly from the fold therein towards the stamens E or, that is, towards what is to be the top of the flower. The wire is then bent to form a loop extending through the notches C around the group of petal leaves A and the free end then is wrapped again around the stamens E. A second group of petals is placed on the other side of the stem and a second loop preferably extending outwardly diametrically opposite from the first loop is formed around the second group of petal leaves in like manner. The free ends of the wires used to form the loops may be twisted together to form the stem D as shown in Fig. 9. If the flower B is formed as shown and if the petals are of rubber or other resilient material when the petals are released after they have been attached to the stem they will spring into the position shown in Figs. 4 and 5 and an artificial flower nearly approaching the appearance of a real flower will be formed. Likewise, if the petals A are formed of rubber or other elastic material they will have the fragile appearance of a real flower but, because of the inherent elasticity of the material, they will be rugged and strong and will not easily deteriorate in use.

In forming a sprig of foliage leaves A' a loop is formed surrounding one or more leaves and the free ends of the wire forming the loop are then twisted to form a stem D as shown in Fig. 8. Likewise, in forming a bud, as described above, a few petal leaves A are included in a loop with one or more foliage leaves A' and a thimble J is then passed over the stem into a position where the large open end thereof surrounds and compresses the middle portions of the leaves A and A', as shown in Fig. 10. To form a spray of flowers, as shown in Fig. 11, the stems of several flowers B, several buds and several sprigs of leaves are twisted together and then the stems of the completed spray are, preferably, wrapped with a cloth covering of suitable color.

As stated above in making artificial flowers of various kinds it may be necessary to change somewhat the shape and specific arrangements of various parts, but it may be readily understood that these details of construction may be varied within wide limits without deviating from the spirit of my invention as included in the claims set forth below.

What I claim as new and desire to secure by Letters Patent, is:—

1. An artificial flower comprising a stem, a plurality of leaves each having a notched edge, and a loop extending from said stem, around said leaves and through said notches whereby said leaves will be attached to said stem.

2. An artificial flower comprising a stem, a plurality of elongated leaves having their edges notched substantially centrally longitudinally thereof, and a loop extending from said stem around said leaves and through said notches whereby said leaves will be attached to said stem.

3. An artificial flower comprising a stem, a plurality of leaves, said leaves being divided into a plurality of groups with said stem positioned therebetween, and a plurality of loops extending from said stem and each of said loops extending around a group of said leaves whereby said leaves will be attached to said stem.

4. An artificial flower comprising a stem, a plurality of leaves having notched edges, said leaves being divided into a plurality of groups with said stem positioned therebetween and a plurality of loops extending from said stem substantially diametrically opposed from each other and each of said loops extending around a group of said leaves and through said notches whereby said leaves will be attached to said stem.

5. An artificial flower comprising a stem, a plurality of elongated leaves each folded longitudinally and positioned with the side portions thereof extending upwardly from said fold, and a loop extending from said stem and engaging said leaves whereby said leaves will be attached to said stem.

6. An artificial flower comprising a stem terminating at its upper end in a plurality of stamens, a plurality of elongated leaves having notched edges, each of said leaves being folded longitudinally and positioned with the side portions thereof extending upwardly from said fold, said leaves being divided into two groups with said stem positioned therebetween, and a pair of loops extending from said stem below said stamen substantially diametrically opposed from each other and each of said loops extending around a group of leaves and through said notches whereby said leaves will be attached to said stem.

7. An artificial flower comprising a stem, a plurality of elongated leaves of elastic material each being folded longitudinally and positioned with the side portions thereof extending upwardly from said fold, and a loop extending from said stem and around said leaves whereby said leaves will be attached to said stem.

8. An artificial flower comprising a stem, a plurality of leaves of elastic material having notched edges, each of said leaves being folded longitudinally and positioned with the side portions thereof extending upwardly from said fold, said leaves being divided into a plurality of groups with said stem positioned therebetween and a plurality of loops extending from said stem and each of said loops extending around a group of said leaves and through said notches whereby said leaves will be attached to said stem.

9. A method of making an artificial flower consisting of forming a wire stem so as to provide a loop at the upper end thereof and including in said loop a plurality of elongated leaves each of which are folded longitudinally with the side portions thereof extending upwardly from the fold.

10. A method of making an artificial flower consisting of forming a wire stem so as to provide a plurality of loops at the upper end thereof and including in each of said loops a plurality of leaves each having notches in their edges through which said loops pass and each being folded longitudinally with the side portions thereof extending upwardly from the fold.

In witness whereof I have signed my name to the foregoing specification.

DORA C. GOCKEL.